United States Patent
Oswald et al.

(10) Patent No.: US 10,723,250 B2
(45) Date of Patent: *Jul. 28, 2020

(54) ACOUSTIC TRANSDUCER ASSEMBLY DISPOSED IN VEHICLE SEAT

(71) Applicant: Bose Corporation, Framingham, MA (US)

(72) Inventors: Charles Oswald, Salem, NY (US); Tobe Z. Barksdale, Bolton, MA (US); Michael S. Dublin, Cambridge, MA (US); Ryan C. Struzik, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,464

(22) Filed: May 9, 2019

(65) Prior Publication Data

US 2019/0263304 A1    Aug. 29, 2019

Related U.S. Application Data

(63) Continuation of application No. 15/245,919, filed on Aug. 24, 2016, now Pat. No. 10,293,728.

(51) Int. Cl.
*B60N 2/879*    (2018.01)
*B60N 2/806*    (2018.01)
(Continued)

(52) U.S. Cl.
CPC ........... *B60N 2/879* (2018.02); *B60N 2/0244* (2013.01); *B60N 2/806* (2018.02); *B60N 2/885* (2018.02)

(58) Field of Classification Search
CPC ........ B60N 2/879; B60N 2/806; B60N 2/885; B60N 2/4876; B60N 2/4882;
(Continued)

(56) References Cited

U.S. PATENT DOCUMENTS 6,744,898 B1    6/2004  Hirano
2011/0081038 A1    4/2011  Tracy
(Continued)

FOREIGN PATENT DOCUMENTS

EP    1 083 094    3/2001
JP    03085095    4/1991
(Continued)

OTHER PUBLICATIONS

International Search Report and Written Opinion; PCT/US2017/048121; dated Nov. 24, 2017; 13 pages.
(Continued)

*Primary Examiner* — David L Ton
(74) *Attorney, Agent, or Firm* — Fish & Richardson P.C.

(57) ABSTRACT

The technology described in this document can be embodied in a system that includes a seat headrest enclosing at least one first acoustic transducer that generates audio output in a first frequency range. The system also includes an adjustable headrest wing disposed in front of the seat headrest, the headrest wing being pivotally coupled to the seat headrest and adjustable to one of multiple positions. The headrest wing includes at least one second acoustic transducer that generates audio output in a second frequency range that includes frequencies higher than the upper end of the first frequency range. The system further includes a controller configured to adjust, for a given position of the headrest wing, one or more parameters of at least one of: (i) the first acoustic transducer and (ii) the second acoustic transducer in accordance with a target acoustic distribution.

20 Claims, 6 Drawing Sheets

(51) Int. Cl.
*B60N 2/885* (2018.01)
*B60N 2/02* (2006.01)

(58) Field of Classification Search
CPC .................. B60N 2/0244; H04R 5/023; H04R 2201/028; H04S 7/308
See application file for complete search history.

(56) References Cited

U.S. PATENT DOCUMENTS

| | | |
|---|---|---|
| 2011/0216926 A1 | 9/2011 | Riggs |
| 2015/0049887 A1 | 2/2015 | Bleacher et al. |
| 2016/0023763 A1 | 1/2016 | Tracy |

FOREIGN PATENT DOCUMENTS

| | | |
|---|---|---|
| JP | 03085096 | 4/1991 |
| JP | 2009 017094 | 1/2009 |
| JP | 2016-74409 | 5/2016 |
| WO | WO 2013/182297 | 12/2013 |
| WO | WO 2017/160594 | 9/2017 |

OTHER PUBLICATIONS

Japanese Office Action in JP Appln. No. 2019-510915, dated Apr. 13, 2020, 6 pages (with English translation).

FIG. 4

ACOUSTIC TRANSDUCER ASSEMBLY DISPOSED IN VEHICLE SEAT

CLAIM OF PRIORITY

This application is a continuation application of U.S. patent application Ser. No. 15/245,919, filed on Aug. 24, 2016, the entire contents of which are hereby incorporated by reference.

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a system that includes a seat headrest enclosing at least one first acoustic transducer that generates audio output in a first frequency range. The system also includes an adjustable headrest wing disposed in front of the seat headrest, the headrest wing being pivotally coupled to the seat headrest and adjustable to one of multiple positions. The headrest wing includes at least one second acoustic transducer that generates audio output in a second frequency range that includes frequencies higher than the upper end of the first frequency range. The system further includes a controller configured to adjust, for a given position of the headrest wing, one or more parameters of at least one of: (i) the first acoustic transducer and (ii) the second acoustic transducer in accordance with a target acoustic distribution.

In another aspect, this document features a method that includes receiving information indicative of a particular position of an adjustable headrest wing pivotally coupled to a seat headrest, and determining, by a controller for the particular position of the headrest wing, one or more parameters for an output of at least one of: (i) a first acoustic transducer disposed within the seat headrest, and (ii) a second acoustic transducer disposed within the adjustable headrest wing. The one or more parameters are determined in accordance with a target acoustic distribution. The method also includes adjusting an output of at least one of the first and second acoustic transducers in accordance with the one or more parameters.

In another aspect, this document features one or more machine-readable storage devices having encoded thereon computer readable instructions for causing one or more processors to perform various operations. The operations include receiving information indicative of a particular position of an adjustable headrest wing pivotally coupled to a seat headrest, and determining, for the particular position of the headrest wing, one or more parameters for an output of at least one of: (i) a first acoustic transducer disposed within the seat headrest, and (ii) a second acoustic transducer disposed within the adjustable headrest wing. The one or more parameters are determined in accordance with a target acoustic distribution. The operations also include adjusting an output of at least one of the first and second acoustic transducers in accordance with the one or more parameters.

In another aspect, this document features a system that includes a seat headrest, and an adjustable headrest wing disposed in front of the seat headrest. The headrest wing is pivotally coupled to the seat headrest and adjustable to one of multiple positions. The system includes at least one acoustic transducer disposed within the seat headrest, the at least one acoustic transducer configured to radiate acoustic output through a corresponding acoustic channel disposed between the acoustic transducer and an external surface of the seat headrest. The system also includes a controller configured to adjust, for a given position of the headrest wing, one or more parameters of the at least one acoustic transducer in accordance with a target acoustic distribution.

The above aspects can include one or more of the following features.

The first acoustic transducer can be a midrange driver. The second acoustic transducer can be a tweeter. A sensor can be used to detect the given position of the headrest wing. The one or more parameters include at least one of a gain and/or a phase. The one or more parameters can be determined in accordance with a beamforming process. The at least one parameter can include an equalization parameter. The controller can be configured to determine the equalization parameter to achieve a target spectral correction for the corresponding transducer. The controller can include a crossover filter for splitting an input signal into the first and second frequency ranges.

Implementations of the above aspects can include one or more of the following features.

Various implementations described herein may provide one or more of the following advantages. High frequency acoustic transducers (e.g., tweeters) disposed within headrest wings of a vehicle seat may provide short and acoustically directional paths to the ears of an occupant. In some cases, combining this with one or more other acoustic transducers (e.g., mid-range drivers) disposed within the headrest may improve the near-field acoustics for vehicle audio systems. By putting the tweeters in the headrest together with other transducers such as mid-range drivers, a bandwidth of acoustic signals that may be delivered through headrest transducers may be increased. By controlling one or more equalization parameters associated with the acoustic transducers disposed in the headrest, a significant degree of control over the acoustic output may be achieved, which in turn may result in improved user-experience. For example, adjusting gain and other equalization parameters (e.g., phase equalization) based on a position of the headrest wings may allow for an acoustic experience to remain substantially unchanged for an occupant when the positions of the headrest wings are altered. In some cases, the technology described herein may also improve acoustic isolation with respect to other seats, thereby allowing the occupant of one seat to listen to audio content without significant leakage to/from other seats. This in turn may also allow for increased personalization of the audio content, thereby further improving the listening experience for an occupant of the seat.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Vehicle seats (e.g., seats used in cars, trucks, buses, trains, aircrafts, boats, or other vehicles) can be fitted with acoustic transducers or speakers for delivering a near-field acoustic experience. In some cases, speakers are fitted into seats such that the speakers are proximate to the ears of an occupant of the seat, to provide an immersive, and potentially personalized acoustic experience. Headrests of vehicle seats often include adjustable, substantially lateral projections on one or both sides. These projections, also referred to as wings, can be adjusted (e.g., manually, or via electronic control signals) to different positions, for example, to support the head of an occupant in a comfortable position. The technology described in this document allows for a portion of an acoustic transducer assembly to be disposed in such wings. For example, acoustic transducers (e.g., speakers or drivers) outputting audio in a mid-range frequency band can be disposed within a body of a headrest, while relatively higher frequency drivers (e.g., tweeters) may be disposed in the adjustable wings. In some cases, because the nearfield length is shorter for higher frequencies, disposing high frequency drivers in the adjustable wings may provide an immersive and high quality acoustic experience for an occupant of the seat. In some implementations, the acoustic output of one or more of the acoustic transducers may be adjusted based on the position of the wings, for example, to provide an occupant with a substantially uniform acoustic experience for different positions of the wings. For example, if the occupant adjusts the wings to a new position, the transfer function of acoustic paths between the occupant's ears and one or more acoustic transducers of the headrest may change. Accordingly, one or more signal processing parameters (e.g., gain) associated with the corresponding acoustic outputs can be adjusted to account for the changes to such transfer functions. In some implementations, this can be used for maintaining a substantially uniform listening experience for the occupant for the different positions of the headrest wings. Therefore, in some cases, the technology may improve vehicular acoustics by providing high quality audio, which may be generated and delivered with a significant degree of control. This document primarily uses examples of vehicle seat headrests to illustrate the technology. However, the technology may be applicable to other types of acoustically enabled seats or furniture that may have speakers installed in the manner described herein. For example, the technology can be used in massage chairs, sofas, recliners, tables, gaming chairs, theater seats, or beds fitted with speakers.

Figure 1:
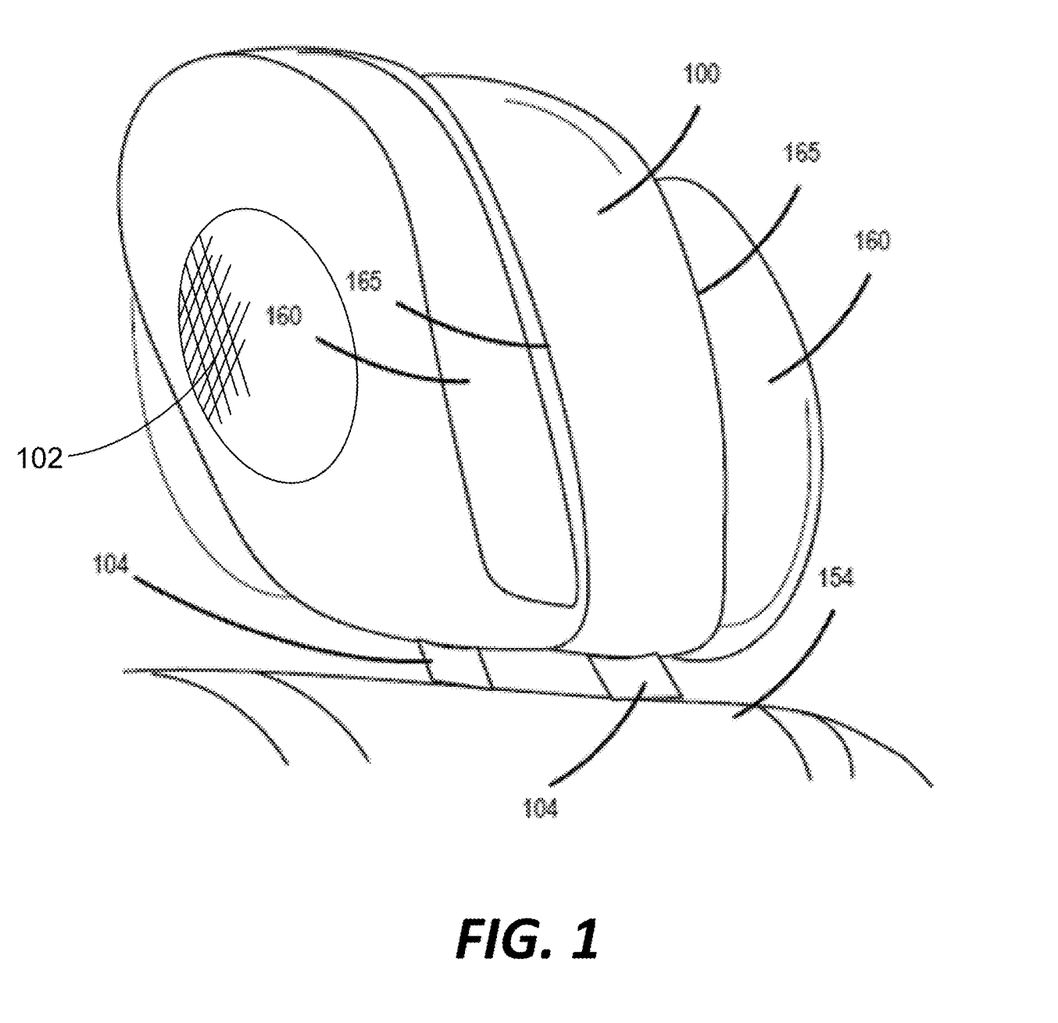
FIG. 1 is a perspective view of a headrest with wings.

FIG. 1 illustrates an example of a headrest 100 that incorporates acoustic transducers or speakers. The speakers can be disposed within a housing of the headrest, and positioned such that the speakers are directly behind the user's head and to fire outwardly, in diverging directions on either side of the headrest 100. In some cases, the acoustic output from the speakers can be radiated out of the headrest 100 through an acoustic channel having an opening 102 disposed on an outer face of the headrest (or headrest wing).

The support rod 104 (which may also be referred to as a bar) can be used for mounting the headrest on a backrest 154 of a vehicle seat. While FIG. 1 shows two support rods 104, the number of support rods may be different in other implementations. For example, a headrest 100 may be mounted on a backrest 154 using a single support rod 104. In another example, a headrest 100 may be mounted on a backrest 154 using three or more support rods 104. The headrest 100 may be mounted on the backrest 154 such that the headrest is movable with respect to the backrest to different positions over an adjustable range. For example, depending on the length of the one or more support rods 104, the headrest 100 may be moved up and down to different heights in order to support the head of an occupant. Once adjusted to a suitable height for an occupant, the headrest 100 may be fixed, for example using a locking mechanism, at that particular height.

In some implementations, the headrest can include adjustable projections or wings 160 on one or both sides of the headrest 100. The adjustable wings 160 can be adjusted with respect to the headrest 100 to support an occupants head against lateral movement. For example, the wings 160 may be moved forward angularly with respect to the headrest 100 (e.g., on corresponding axes or hinges 165) to a position that supports an occupant's head against lateral movement. The wings may also be moved backwards angularly with respect to the headrest 100 such that the wings are substantially on the same plane as the rest of the headrest 100.

Figure 2A:
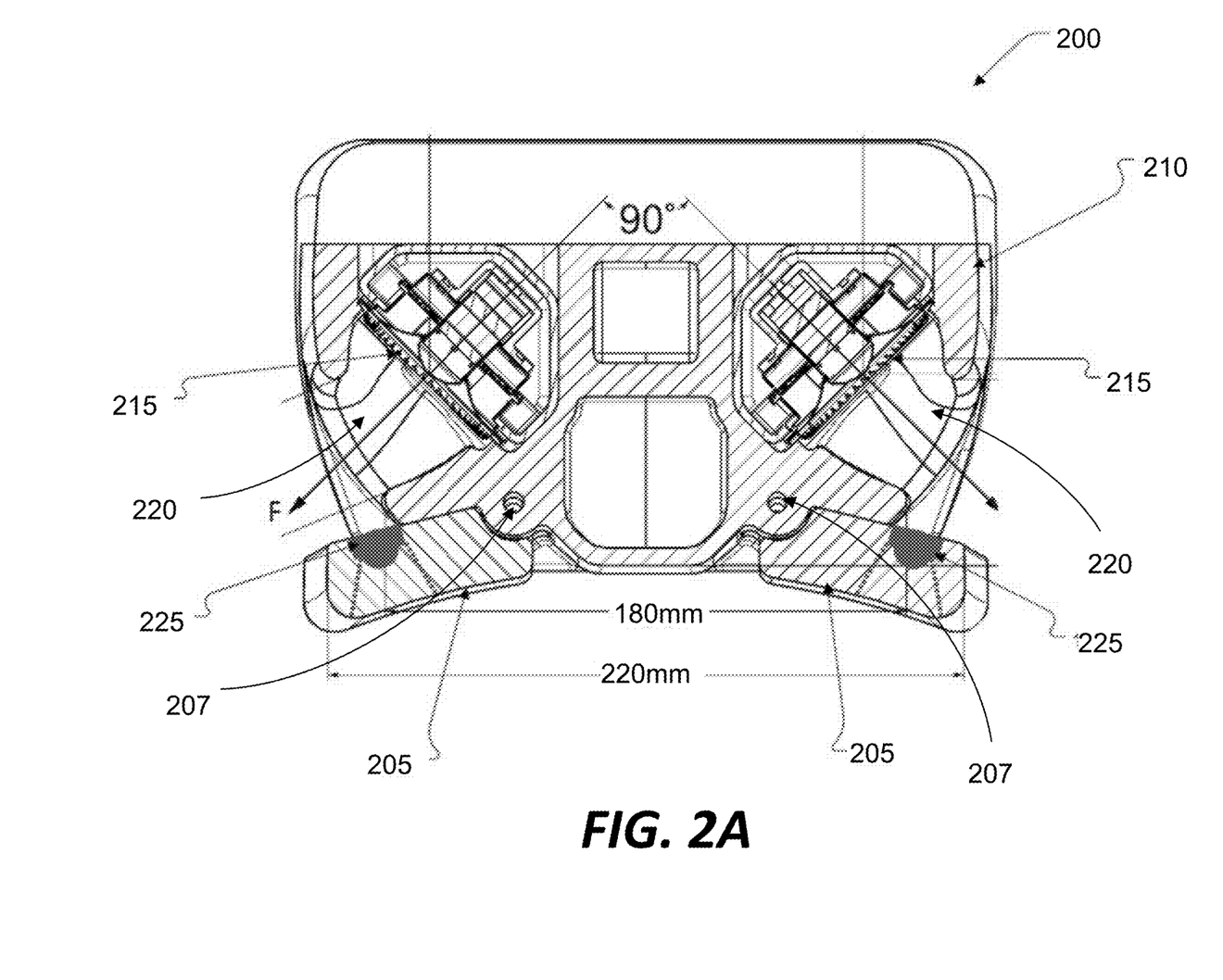
FIGS. 2A-2B are each a top cross-sectional view of an example of a headrest that includes acoustic transducers disposed within the headrest housing and also within adjustable headrest wings disposed in front of the headrest.
Figure 2B:
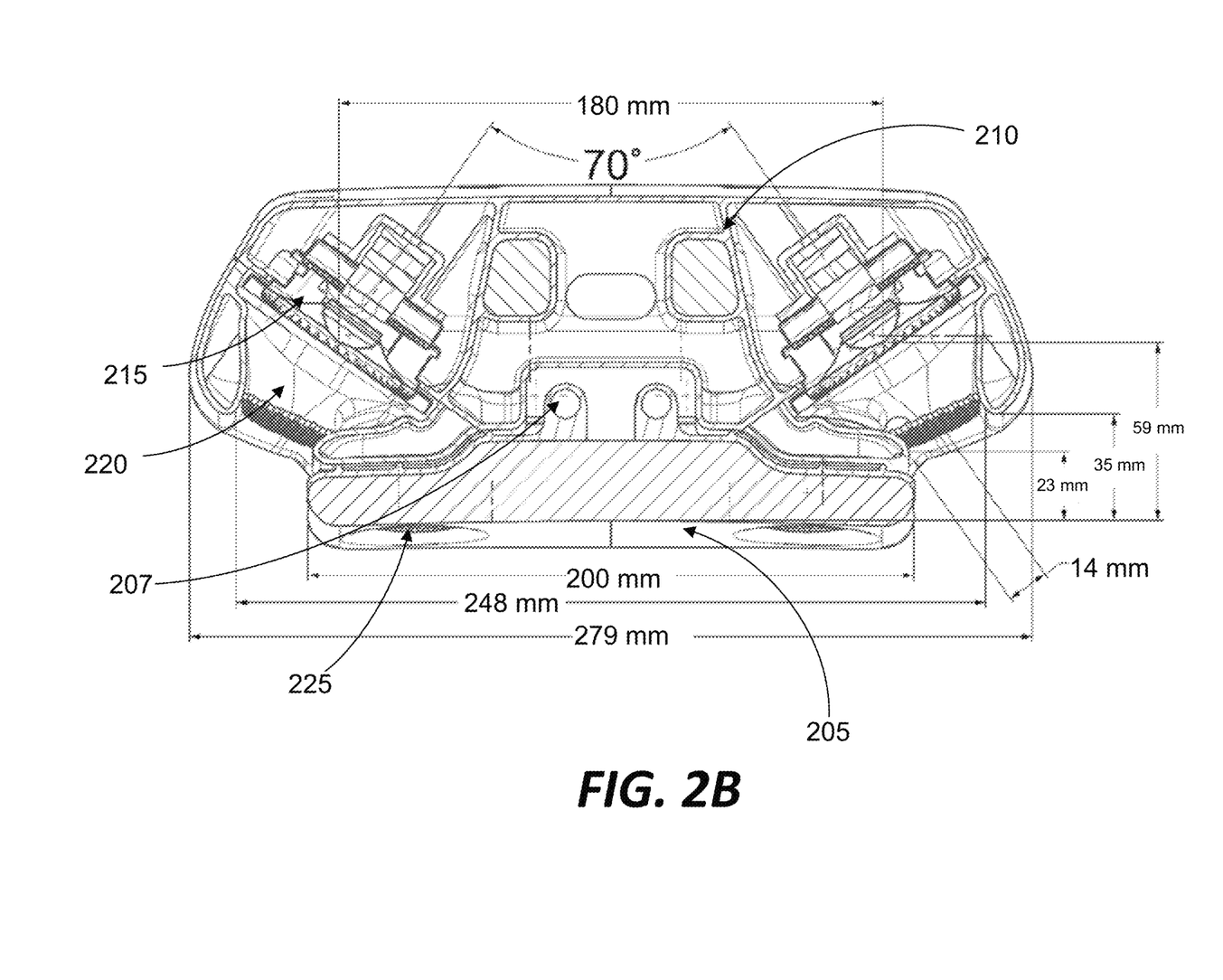

In some implementations, a headrest wing may be pivotally coupled to a seat headrest in front of the seat headrest. Examples of such headrests 200 and 250 are shown in FIGS. 2A and 2B, respectively. Specifically, each of the FIGS. 2A and 2B shows a top cross-sectional view of an example headrest that includes acoustic transducers disposed within the headrest housing and also within adjustable headrest wings disposed in front of the headrest. In the example of FIG. 2A, the headrest 200 includes two wings 205 disposed in front of the headrest housing 210. Each of the wings 205 is coupled to the headrest housing 210 at a corresponding pivot 207 such that the wing 205 is adjustable to one of multiple positions within an angle range. For example, each of the wings 205 can be rotated over an angle range with respect to the corresponding axis or pivot 207. The axis or pivot 207 can be stationary with respect to the housing 210 such that the wings 205 can be moved to one of various positions with respect to the housing 210 of the headrest. Although FIG. 2 shows a dedicated pivot 207 for each of the wings 205, other mechanisms of moving the wings with respect to the headrest housing 210 (e.g., a hinge, a living hinge, or a flexible material in the wings) may also be used. In some implementations, the angle range can be less than about 45°. For example, some headrests 200 can be designed such that the wings 205 can be rotated to a position between 0 and 30° angle range. The wings 205 can be manually adjustable, for example, by an occupant's hands, or adjustable by an electronic control signal.

In some implementations, the dimensions of such pivotally coupled wings may not be sufficient to accommodate large acoustic transducers such as mid-range drivers or speakers (e.g., speakers generating audio output in 100 Hz-1 KHz frequency range). In such cases, the mid-range drivers 215 may be disposed within the headrest housing 210, and configured to radiate their acoustic output through respective acoustic channels 220 having outlets on the headrest housing 210. Smaller acoustic transducers (e.g., tweeters generating acoustic outputs at relatively higher frequencies) may however be disposed within the headrest wings. The example of FIG. 2 shows a high-frequency driver 225 disposed in each of the wings 205. The high frequency drivers 225 may also be referred to as tweeters or treble speakers, and configured to produce high audio frequencies, typically between 2 KHz to 20 KHz. In some implementations, the high-frequency drivers may be configured to generate audio output corresponding to frequency outside the 2 KHz-20 KHz range. For example, the high-frequency drivers 225 may be configured to generate audio output corresponding to frequencies of around 800 Hz or higher.

The mid-range drivers 215 can be disposed within the headrest housing 210 in various ways. In some implementations (e.g., as shown in FIG. 2A), the mid-range drivers 220 may be disposed such that the central axes of the drivers form an angle of about 90° with one another, and/or the corresponding acoustic channels 220 have outlets on the side of the headrest housing 210. In some implementations, the mid-range drivers may be disposed at other angles (e.g., at around 70° with one another, as shown in FIG. 2B) and/or the corresponding acoustic channels 220 have outlets disposed substantially at the front of the headrest housing 210. The outlets of the acoustic channels may be disposed at various angles and/or spatial relationships with respect to the headrest wings 215. For example, the outlets of the acoustic channels can be disposed behind at least a portion of the headrest wing 205 (e.g., as shown in FIG. 2A), or adjacent to the headrest wing 205 (e.g., as shown in FIG. 2B).

Even though FIG. 2A shows only one high frequency driver 225 in each wing 205, additional high frequency drivers may be disposed in a wing 205. For example, a wing 205 can include an array of high frequency drivers such as an array of tweeters. In some implementations, the one or more high frequency drivers 225 in one of the wings may be different from the one or more high frequency drivers 225 in the other wing. In some implementations, other acoustic elements such as one or more of: an amplifier, a processor, a digital signal processor (DSP), a sensor etc. may also be disposed in one of the wings 205 or the housing 210.

In some cases, the relative positioning of the mid-range drivers 215 and the high-frequency drivers 225 may pose challenges with respect to the resulting acoustic distribution. For example, the configuration of the mid-range drivers 215 embedded in the headrest housing 210 may, in some cases, result in an unbalanced ratio of acoustic energies produced by the mid-range drivers 215 and the high-frequency drivers 225, respectively. In addition, adjusting the headrest wings 205 to a different position may change the relative spatial distribution of the mid-range and high frequency drivers, thereby changing the acoustic paths (and consequently the associated transfer functions) between the drivers and an occupant of the seat.

In some implementations, the technology described herein facilitates automatically adjusting one or more parameters associated with the various acoustic transducers based on, for example, detecting the position of the wings. Such adjustments may account for the changes to the transfer functions, and in some cases, may result in a more consistent listening experience for the occupant across the various relative positions of the mid-range drivers 215 and the high frequency drivers 225.

Figure 3A:
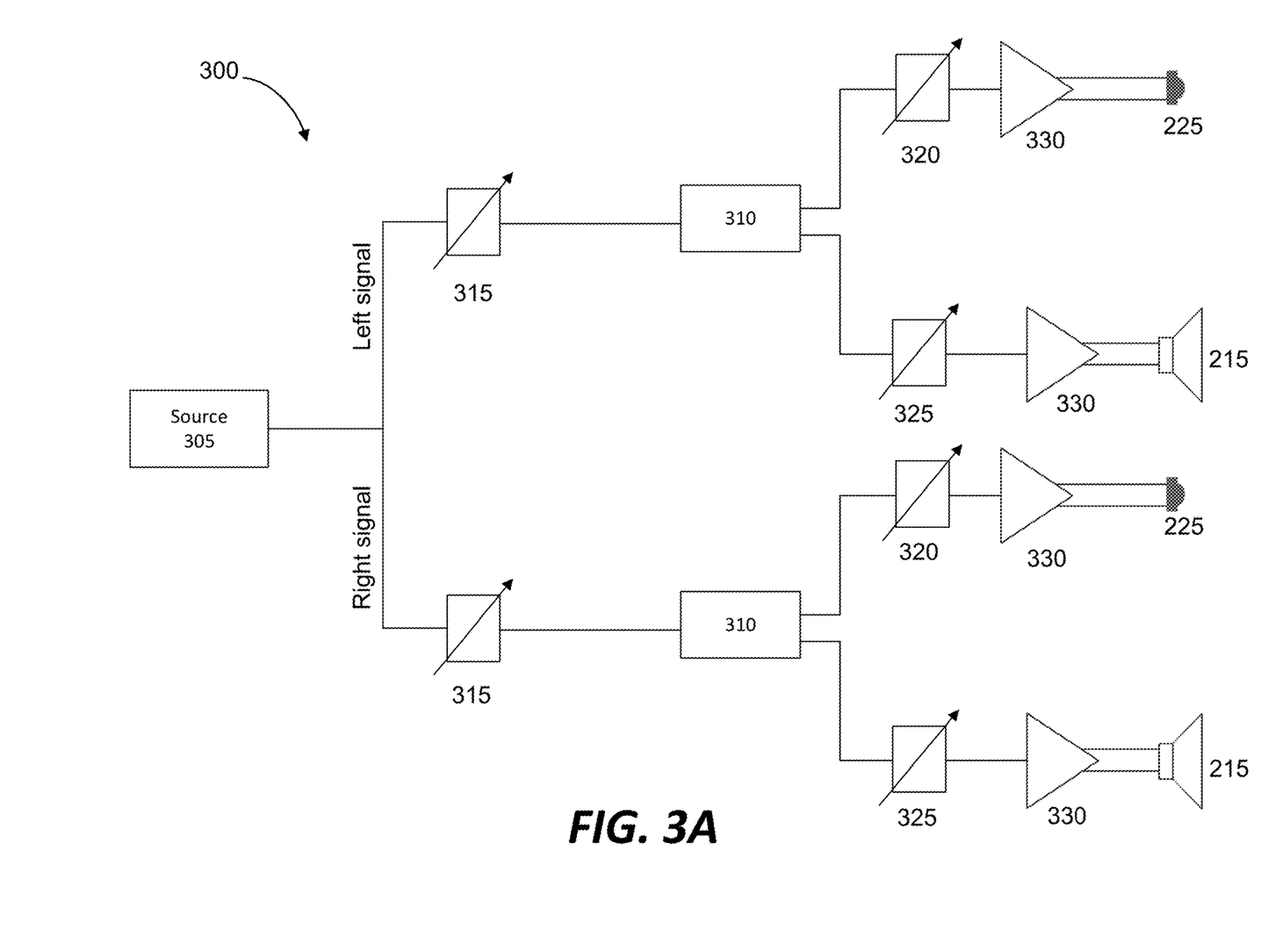
FIG. 3A is a block diagram of example circuitry associated with multiple acoustic transducers disposed within a seat headrest, the circuitry including an active crossover filter.

FIG. 3A is a block diagram of example circuitry 300 associated with multiple acoustic transducers disposed within a seat headrest. In the example of FIG. 3A, the signal from a source 305 is split into two parts, which are referred to as the left signal and the right signal. In some implementations, the left signal and right signal may correspond to the left channel audio and the right channel audio of a stereo system. Each of the parts is then provided to a separate branch of the circuitry for a corresponding output to be generated through a set of mid-range driver 215 and high-frequency driver 225. The two mid-range drivers 215 of the circuitry 300 may be disposed such that the corresponding audio outputs are radiated from the two sides of a headrest, for example, as depicted in the example of FIG. 2. The two high frequency drivers 225 may be disposed in the two adjustable wings of a headrest, for example, as depicted in the example of FIG. 2.

In the example of FIG. 3A, the circuitry 300 includes an active crossover filter 310 in each of the branches for the left channel audio and right channel audio. Crossover filters (also known as audio crossovers) are electronic filters (analog or digital) that are used in audio applications to split incoming signal into two or more frequency bands that can be separately routed to corresponding acoustic transducers capable of generating audio outputs for those bands. Crossover filters can be of an active type or a passive type. Active crossover filters may be configured to split the incoming signal prior to amplification, and perform additional signal processing, including, for example, introducing amplitude limits, delay, and equalization parameters. Passive crossover filters, on the other hand, may be configured to split the incoming signal after amplification, and implemented, for example, with passive circuit elements such as capacitors and inductors. The crossover filters 310 for the left signal path and right signal path may be configured independently of one another. For example, the coefficients for the crossover filter 310 in the left signal path may be selected independently of the selection of the coefficients for the crossover filter 310 in the right signal path. In some implementations, crossover filters of different types may be selected for the two paths. For example, one path may have an active crossover filter while the other path has a passive crossover filter.

In the example shown in FIG. 3A, an active crossover filter 310 can be configured to split the incoming signal into a first frequency range or band and a second frequency range or band for the mid-range driver 215 and the high frequency driver 225, respectively. There may or may not be a partial overlap between the first and second frequency bands. In either case, the second frequency band includes at least some frequencies that are higher than the upper end of the first frequency range. In some implementations, the active crossover filter 310 can be configured to route signal components in the low-mid frequency range (e.g., frequencies below a threshold over which the corresponding driver and the audio signal start to become directional, e.g., 800 Hz) to the mid-range driver 215, and signal components in the mid-high frequency range (e.g., 800 Hz to 20 KHz) to the high frequency drivers 225. In some implementations, the audio output from the high frequency driver 225 is substantially directional. Therefore, positioning such drivers in the headrest wing may allow for the output to be directed to the ears of the occupant of the seat without additional processing such as beamforming. In some implementations, the gain of such directional audio output may be controlled such that the audio output does not interfere significantly with the acoustic experience of an occupant of a different seat.

In some implementations, one or more parameters (e.g., gain, equalization parameters, etc.) of a mid-range driver 225 and/or the corresponding high frequency driver 225 is dynamically adjusted based on the position of the wings to accommodate for changes (e.g., changes in spectral characteristics manifested, for example, as changes to transfer functions of associated acoustic paths) attributable to the resulting changes in relative positions of the drivers. In some implementations, the circuitry 300 includes an equalizer 315 for each of the audio channels, the equalizer 315 configured to adjust one or more parameters of the signal prior to the signal being processed by the crossover filter 310. Therefore, the equalizer 315 can be used for implementing adjustments applicable to both drivers 215 and 225 of a particular audio channel path. In some implementations, the adjustments can be made based on a position of the corresponding headrest wing, for example, to help ensure a consistent listening experience regardless of the wing position.

In some implementations, the circuitry 300 can also include one or more additional equalizers for adjusting the signals to the individual drivers. For example, the signals to a high-frequency driver 225 can be processed by an equalizer 320, and/or the signals to a mid-range driver 215 may be processed by an equalizer 325. For example, an equalizer 325 may be used for adjusting the output of the corresponding mid-range speaker based on the wing position to obtain a desired beamforming pattern (e.g., in conjunction with the other mid-range driver 215 of the headrest) and maintain the inter-aural level difference for each position of the adjustable wings. In some cases, because the output of the high-frequency drivers 225 may already be sufficiently directional, the corresponding equalizers 320 may be used for adjusting the gain (e.g., without using a beamforming process) based on the position of the corresponding headrest wings. In some implementations, the equalizers 320 and/or 325 may be used for performing spectral corrections in the corresponding frequency bands. In some implementations, at least a portion of the adjustments performed using the equalizer 315 may be done using the equalizers 320 and 325, which may, in some cases, obviate the need for the equalizer 315. In some implementations, where there is a bandwidth overlap between the midrange and high frequency drivers, the equalizers 320 and 325 can be used in combination to achieve a target beam pattern. In such cases, the equalizers 320 and 325 can be adjusted dynamically, e.g., based upon positions of the wings, to achieve a corresponding target beam pattern. In some implementations, the target beam pattern for a given set of positions for the wings can be set in accordance with one or more design parameters including, for example, a target in-seat experience, a threshold level of energy leakage to other occupants, or a combination of both.

In some implementations, the circuitry 300 includes an amplifier 330 for amplifying the signal on the output path connected to an acoustic transducer. In the example of FIG. 3A, the circuitry includes an active crossover filter 310 for each set of mid-range and high frequency acoustic transducers (215, 225), and each output path coming out of the crossover filters 310 includes an amplifier 330 associated with the corresponding acoustic transducer.

Figure 3B:
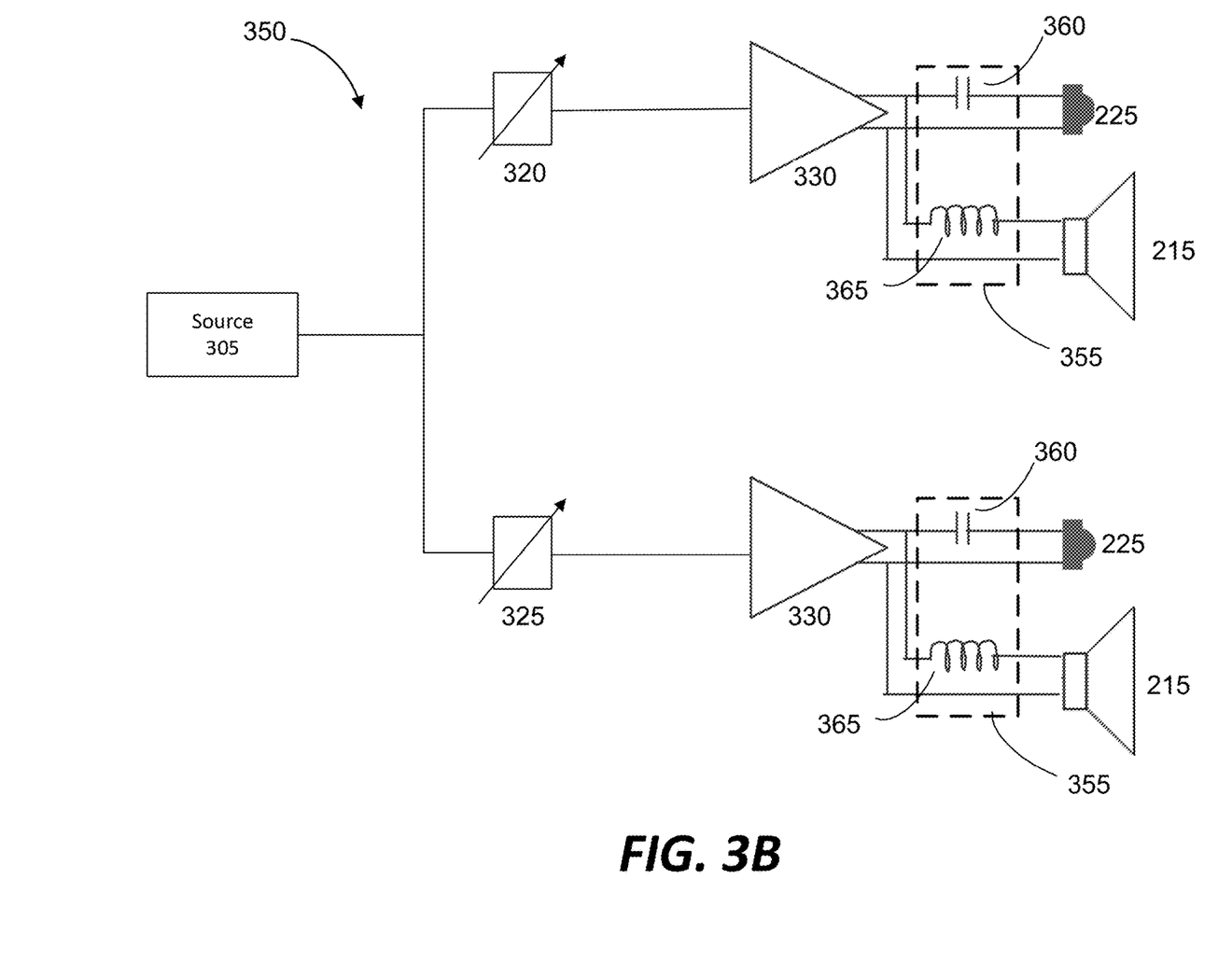
FIG. 3B is a block diagram of example circuitry associated with multiple acoustic transducers disposed within a seat headrest, the circuitry including a passive crossover filter.

In some implementations, a single amplifier may be used to amplify the signals for each set of mid-range and high frequency acoustic transducers. This is illustrated in the example of FIG. 3B, which shows the circuitry 350 associated with multiple acoustic transducers disposed within a seat headrest to include passive cross over filters 355. In contrast to the active crossover filters 310, the passive crossover filters are disposed in the signal path downstream from the corresponding amplifiers 330, such as between an amplifier 330 and the corresponding acoustic transducer. In the example shown in FIG. 3B, the crossover filters 355 each include passive elements such as a capacitor 360 between an amplifier 330 and the corresponding high frequency driver 225, and an inductor 365 between an amplifier and the corresponding mid-range driver 230. The specific passive crossover filter 355 shown in FIG. 3B is shown for illustrative purposes, and other configurations of the passive crossover filters are also possible. For example, one or more additional passive components such as resistors and/or other capacitors or inductors may be used in implementing a passive crossover filter.

Figure 4:
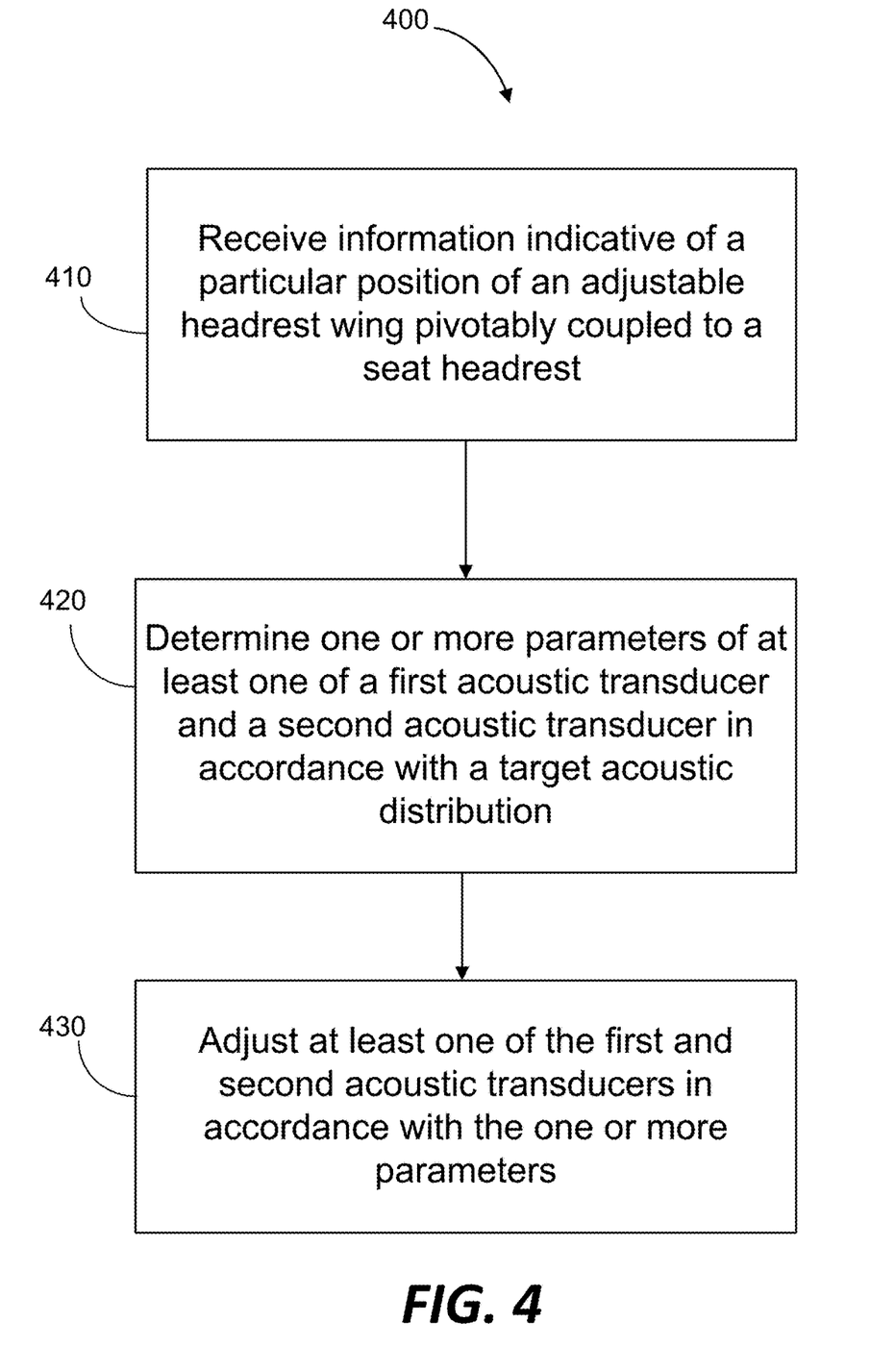
FIG. 4 is a flowchart of an example process for controlling acoustic transducers disposed in a seat headrest.

FIG. 4 is a flowchart of an example process 400 for controlling acoustic transducers disposed in a seat headrest. At least a portion of the operations of the process 400 can be performed by one or more processing devices (e.g., a controller, a microprocessor, or a digital signal processor (DSP)) disposed in communication with an acoustic system of a vehicle seat. Operations of the process 400 includes receiving information indicative of a particular position of an adjustable headrest wing pivotally coupled to a seat headrest (410). One or more coordinate systems, reference points, etc. may be used to represent a wing's position. The adjustable wing can be substantially similar to the headrest wing 205 described above. In some implementations, the input signal can be received from a sensor disposed in the seat headrest (e.g., the headrest 200). Such a sensor can be configured to detect, for example, one of multiple positions within an angle range associated with a current configuration of the headrest wing, and generate a signal including the information indicative of the particular position. In the case of an electronically/motor controlled wing, information indicative of the wing position(s) can be transmitted to the controlling circuitry, for example, through a data bus.

Operations of the process 400 also includes determining, for the particular position of the headrest wing, one or more parameters of an output of at least one of: (i) a first acoustic transducer disposed within the seat headrest, and (ii) a second acoustic transducer disposed within the adjustable headrest wing (420). The one or more parameters can be determined in accordance with a target acoustic distribution. In some implementations, the first acoustic transducer can be a mid-range driver such as the driver 215 described above, and the second acoustic transducer can be a high frequency driver (e.g., a tweeter) such as the driver 225 described above.

In some implementations, the one or more parameters include a gain associated with the corresponding acoustic transducer. For example, the gain of the high frequency driver 225 may be reduced as the headrest wing is moved closer to the ears of an occupant. The gain may be controlled as a function of the angle of the headrest wing (e.g., a linear, quadratic, or higher order function), which may be determined, for example, based on pre-compiled information about delivering a uniform acoustic experience over the range of motion of the headrest wing. In some implementations, the gain may be determined based on a beamforming process. For example, two mid-range drivers of a headrest can be arrayed, and the output of the drivers may be steered via a beamforming process such that a target acoustic distribution is achieved for various positions of the wings. Because high frequency drivers and the corresponding acoustic outputs are typically inherently directional at their upper frequency range, beamforming is not usually needed for such drivers. However, for some high frequency drivers that support relatively low frequencies (e.g., tweeters that support frequencies as low as around 800 Hz), the outputs may be steered using a beamforming process. For example, in situations where the wavelength of the output signal is small as compared to the cone diameter, the directionality of the high frequency driver may be less, and may be improved via a beamforming process.

In some implementations, the one or more parameters can include equalization parameters associated with one or more acoustic transducers for the particular position of the headrest wing. Such equalization parameters may depend on, for example, a spectral response of an acoustic channel formed between the corresponding acoustic transducer and an ear of the occupant for the particular position of the adjustable wing. In some implementations, an equalization parameter can be determined to achieve a target spectral correction for the corresponding transducer.

The one or more parameters can be determined in accordance with a target acoustic distribution (e.g., a volume zone, a particular sound profile etc.) corresponding to the particular seat or occupant. The control parameters can be determined, for example, empirically or experimentally for the various wings positions. For example, the change in one or more acoustic parameters (e.g., loudness levels) at an occupant's ear for various positions of the headrest wings can be measured (qualitatively or quantitatively) in an experimental setup, and the one or more parameters for corresponding acoustic transducers can be adjusted to obtain the same loudness level for various wing positions. Such experimentally determined parameter values can be electronically stored (e.g., as a look-up table) on a storage device. In some implementations, the look-up table can store parameter values corresponding to various sets of positions of the two wings (which may or may not be at the same angle. In some implementations, a target acoustic distribution may be represented, for example, as a ratio of energy of the acoustic output radiating through a high frequency driver 225, and energy of acoustic output radiating from a corresponding mid-range driver 215.

Operations of the process further includes adjusting at least one of the first and second acoustic transducers in accordance with the one or more parameters (430). Associated control signals can be generated by the one or more processors and sent to the acoustic transducer(s). In some implementations, this results in the output of the acoustic transducer being automatically adjusted, in real-time or near real-time, when an occupant of a seat adjusts the headrest wings. Such automatic adjustment may obviate or at least reduce the need for any manual adjustment due to the changed position of the headrest wings.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims.

For example, some implementations may omit the high-frequency drivers while maintaining the mid-range drivers. In such cases, the processes described above may be utilized to adjust the output of the mid-range drivers to account for changes in the transfer function between the mid-range drivers and a listener's ears attributable to a change in the position of the pivotable wings, thereby to maintain a substantially constant or uniform listening experience. That is, the two mid-range drivers of the headrest can be used as an array, and the output of the drivers may be steered via a beamforming process such that a target acoustic distribution is achieved for various positions of the wings. In some implementations, the midrange drivers may be disposed in a different portion of the vehicle seat (e.g., in the backrest 154).

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
    a seat headrest enclosing at least one first acoustic transducer;
    an adjustable headrest wing disposed in front of the seat headrest, the headrest wing being adjustable to one of multiple positions, the headrest wing comprising at least one second acoustic transducer; and
    a controller configured to adjust, for a given position of the headrest wing, one or more parameters of at least one of: (i) the first acoustic transducer and (ii) the second acoustic transducer in accordance with a target acoustic distribution.

2. The system of claim 1, wherein the first acoustic transducer is a midrange driver.

3. The system of claim 1, wherein the second acoustic transducer is a tweeter.

4. The system of claim 1, further comprising a sensor that detects the given position of the headrest wing.

5. The system of claim 1, wherein the one or more parameters include at least one of a gain and a phase.

6. The system of claim 5, wherein the one or more parameters are determined in accordance with a beamforming process.

7. The system of claim 1, wherein the at least one parameter includes an equalization parameter.

8. The system of claim 7, wherein the controller is configured to determine the equalization parameter to achieve a target spectral correction for the corresponding transducer.

9. The system of claim 1, wherein the controller comprises a crossover filter.

10. A method, comprising:
    receiving information indicative of a particular position of an adjustable headrest wing of a seat headrest;
    determining, by a controller for the particular position of the headrest wing, one or more parameters for an output of at least one of: (i) a first acoustic transducer disposed within the seat headrest, and (ii) a second acoustic transducer disposed within the adjustable headrest wing, wherein the one or more parameters are determined in accordance with a target acoustic distribution; and
    adjusting an output of at least one of the first and second acoustic transducers in accordance with the one or more parameters.

11. The method of claim 10, wherein the first acoustic transducer is a midrange driver.

12. The method of claim 10, wherein the second acoustic transducer is a tweeter.

13. The method of claim 10, wherein the information indicative of the particular position is received from a sensor configured to detect positions of the adjustable headrest wing.

14. The method of claim 10, wherein the one or more parameters include at least one of a gain and a phase.

15. The method of claim 14, wherein the one or more parameters are determined in accordance with a beamforming process.

16. The method of claim 10, wherein the one or more parameters include an equalization parameter.

17. The method of claim 16, wherein the equalization parameter is determined to achieve a target spectral correction for the corresponding transducer.

18. One or more machine-readable storage devices having encoded thereon computer readable instructions for causing one or more processors to perform operations comprising:
    receiving information indicative of a particular position of an adjustable headrest wing of a seat headrest, the particular position being one of multiple positions within an angle range;
    determining, for the particular position of the headrest wing, one or more parameters for an output of at least one of: (i) a first acoustic transducer disposed within the seat headrest, and (ii) a second acoustic transducer disposed within the adjustable headrest wing, wherein the one or more parameters are determined in accordance with a target acoustic distribution; and
    adjusting at least one of the first and second acoustic transducers in accordance with the one or more parameters.

19. The one or more machine-readable storage devices of claim 18, wherein the first acoustic transducer is a midrange driver and the second acoustic transducer is a tweeter.

20. The one or more machine-readable storage devices of claim 18, wherein the one or more parameters include at least one of: (i) gain determined in accordance with a beamforming process, and (ii) an equalization parameter determined to achieve a target spectral correction for the corresponding transducer.

* * * * *